United States Patent
Miyahara et al.

(10) Patent No.: US 11,180,153 B2
(45) Date of Patent: Nov. 23, 2021

(54) PARKING SUPPORT DEVICE AND PARKING SUPPORT METHOD

(71) Applicant: MAZDA MOTOR CORPORATION, Hiroshima (JP)

(72) Inventors: Akihiro Miyahara, Hiroshima (JP); Haruki Okazaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 197 days.

(21) Appl. No.: 16/543,841

(22) Filed: Aug. 19, 2019

(65) Prior Publication Data
US 2020/0130698 A1    Apr. 30, 2020

(30) Foreign Application Priority Data

Oct. 24, 2018   (JP) ............... JP2018-200144

(51) Int. Cl.
*B60W 40/06*    (2012.01)
*B60W 30/06*    (2006.01)

(52) U.S. Cl.
CPC ............ *B60W 40/06* (2013.01); *B60W 30/06* (2013.01); *B60W 2552/35* (2020.02); *B60W 2554/00* (2020.02)

(58) Field of Classification Search
CPC combination set(s) only.
See application file for complete search history.

(56) References Cited

U.S. PATENT DOCUMENTS

| | | | |
|---|---|---|---|
| 9,946,255 B2* | 4/2018 | Matters | B62D 15/027 |
| 10,989,547 B2* | 4/2021 | Hamilton | G06K 9/00812 |
| 2014/0222252 A1* | 8/2014 | Matters | G05D 1/0011 701/2 |
| 2016/0371982 A1* | 12/2016 | Arndt | G08G 1/096811 |
| 2018/0093662 A1* | 4/2018 | Kim | G06K 9/00805 |
| 2020/0062308 A1* | 2/2020 | Kim | G05D 1/0016 |
| 2020/0198623 A1* | 6/2020 | Gunzel | B60W 30/095 |
| 2020/0398866 A1* | 12/2020 | Hara | B60W 30/06 |
| 2020/0401127 A1* | 12/2020 | Kramer | G05D 1/0088 |

FOREIGN PATENT DOCUMENTS

JP    2018-122789 A    8/2018

* cited by examiner

*Primary Examiner* — Peter D Nolan
*Assistant Examiner* — Mikko Okechukwu Obioha
(74) *Attorney, Agent, or Firm* — Studebaker & Brackett PC (57) ABSTRACT

A parking support device of the present invention, which is configured to move a vehicle in a longitudinal direction and stop the vehicle in a specified space by using a communication terminal to send a control signal to the vehicle, comprises a step detection part which is configured to detect presence/absence of a step in a moving direction of the vehicle, a moving stop part which is configured to stop moving of the vehicle in a case where presence of the step is detected by the step detection part, and a moving restart part which is configured to restart the moving of the vehicle so as to ride over the step in a case where the control signal from the communication terminal is received after the moving of the vehicle is stopped by the moving stop part.

9 Claims, 5 Drawing Sheets

PARKING SUPPORT DEVICE AND PARKING SUPPORT METHOD

BACKGROUND OF THE INVENTION

The present invention relates to a parking support device and a parking support method which guide a vehicle to a specified space for parking.

A technology for guiding the vehicle to the specified space for parking is conventionally known. This kind of technology is disclosed in Japanese Patent Laid-Open Publication No. 2018-122789, for example. A driving support device disclosed in the above-described patent document comprises an obstacle detection part which is configured to detect an obstacle existing on a surface of a road where the vehicle travels, a determination part which is configured to determine whether the vehicle can ride over the obstacle detected by the obstacle detection part based on information on an established object which is established on the road surface, and a traveling control part which makes the vehicle travel, riding over the obstacle, when it is determined by the determination part that the vehicle is able to ride over the obstacle.

Herein, in a case where the vehicle rides over a step (level difference) on the road surface in vehicle's automatic parking, there are cases where the vehicle sway relatively largely, a relatively large noise is generated, or the like due to a size of the step, a heavy weight of the vehicle, or the like. These kinds of situation may cause some concern to the vehicle user seeing the vehicle's automatic parking from vehicle outside.

SUMMARY OF THE INVENTION

The present invention has been devised in view of the above-described matter, and an object of the present invention is to provide a parking support device and a parking support method which can properly reduce such concern of the vehicle user.

An aspect of the present invention is a parking support device which is configured to move a vehicle in a longitudinal direction and stop the vehicle in a specified space by using a communication terminal to send a control signal to the vehicle, the parking support device comprising a step (level difference) detection part configured to detect presence/absence of a step (level difference) in a moving direction of the vehicle, a moving stop part configured to stop moving of the vehicle in a case where presence of the step is detected by the step detection part, and a moving restart part configured to restart the moving of the vehicle so as to ride over the step in a case where the control signal from the communication terminal is received after the moving of the vehicle is stopped by the moving stop part.

According to the present parking support device, when the presence of the step (level difference) is detected while the vehicle is moving to the specified space, the vehicle moving is stopped and then the vehicle moving is restarted when the control signal (command) from the communication terminal is received. Accordingly, since the vehicle user can recognize the presence of the step, the vehicle user can operate the communication terminal, mentally preparing for that, so that the present parking support device can reduce the above-described concern of the vehicle user properly.

In an embodiment of the present invention, the above-described present parking support device further comprises a wheel determination part configured to determine whether a vehicle wheel which contacts the step for riding over is a drive wheel, wherein the moving stop part is configured to stop the moving of the vehicle after moving the vehicle by a specified distance in an opposite direction to the moving direction in a case where it is determined by the wheel determination part that the vehicle wheel contacting the step is not the drive wheel.

In a case where the vehicle wheel contacting the step is the drive wheel, the vehicle rides over the step by the drive wheel itself, so that it is likely that a power to be transmitted to the drive wheel is utilized for this step riding-over. Consequently, the vehicle rides over the step easily compared to a case where the vehicle wheel contacting the step is not the drive wheel. Meanwhile, if the vehicle wheel contacting the step is not the drive wheel, the above-described situation does not happen, so that there may occur a state where the vehicle does not ride over the step easily. According to this embodiment, however, in the case where it is determined by the wheel determination part that the vehicle wheel contacting the step is not the drive wheel, the above-described vehicle moving is stopped after moving the vehicle by the specified distance in the opposite direction to the moving direction. Thereby, the vehicle can have a so-called running start for the above-described restarting because the vehicle moves further by the specified distance before contacting the step, so that the vehicle can ride over the step properly easily.

In another embodiment of the present invention, the above-described present parking support device further comprises a power part configured to generate a power for moving the vehicle and a brake part configured to brake the vehicle, wherein the moving stop part is configured to stop the moving of the vehicle through braking conducted by the brake part, without stopping generation of the power conducted by the power part, and maintain stopping of the moving of the vehicle.

According to this embodiment, since the above-described vehicle moving is stopped through braking conducted by the brake part, without stopping generation of the power conducted by the power part, and this stopping is maintained, it is only necessary to control the brake part but controlling of the power part is unnecessary during the vehicle stop. Thereby, the control processing of parking support can be facilitated.

In another embodiment of the present invention, the above-described present parking support device further comprises a riding-over propriety determination part configured to determine whether the vehicle wheel is able to ride over the step, wherein the moving restart part is configured to stop the moving of the vehicle again in a case where it is determined by the riding-over propriety determination part that the vehicle wheel is unable to ride over the step after the restarting of the moving of the vehicle based on reception of the control signal from the communication terminal.

According to this embodiment, since the above-described vehicle moving is stopped again in the case where it is determined that the vehicle wheel is unable to ride over the step after the above-described restarting of the vehicle moving, any improper thing which may happen in a case the vehicle is forced to repeatedly ride over the step, such as any damage caused to the vehicle, can be avoided.

Another aspect of the present invention is a parking support method which is configured to move a vehicle in a longitudinal direction and stop the vehicle in a specified space by using a communication terminal to send a control signal to the vehicle, the parking support method comprising steps of detecting presence/absence of a step in a moving direction of the vehicle, stopping moving of the vehicle in a case where presence of the step is detected by the step of detecting the presence/absence of the step, and restarting the moving of the vehicle so as to ride over the step in a case where the control signal from the communication terminal is received after the moving of the vehicle is stopped by the step of stopping the moving of the vehicle.

According to the present parking support method, when the presence of the step (level difference) is detected while the vehicle is moving to the specified space, the vehicle moving is stopped, and the vehicle moving is restarted when the control signal from the communication terminal is received. Accordingly, since the vehicle user can recognize the presence of the step, the vehicle user can operate the communication terminal, mentally preparing for that, so that the present parking support method can reduce the above-described concern of the vehicle user properly.

Other features, aspects, and advantages of the present invention will become apparent from the following description which refers to the accompanying drawings.

DETAILED DESCRIPTION OF THE INVENTION

Hereafter, one or more embodiments of the present invention will be described referring to the drawings. However, the scope of the invention is not limited to the disclosed embodiment(s). In the figures, since the same structures are denoted by the same reference characters, specific description of each of those will be omitted case by case.

Figure 1:
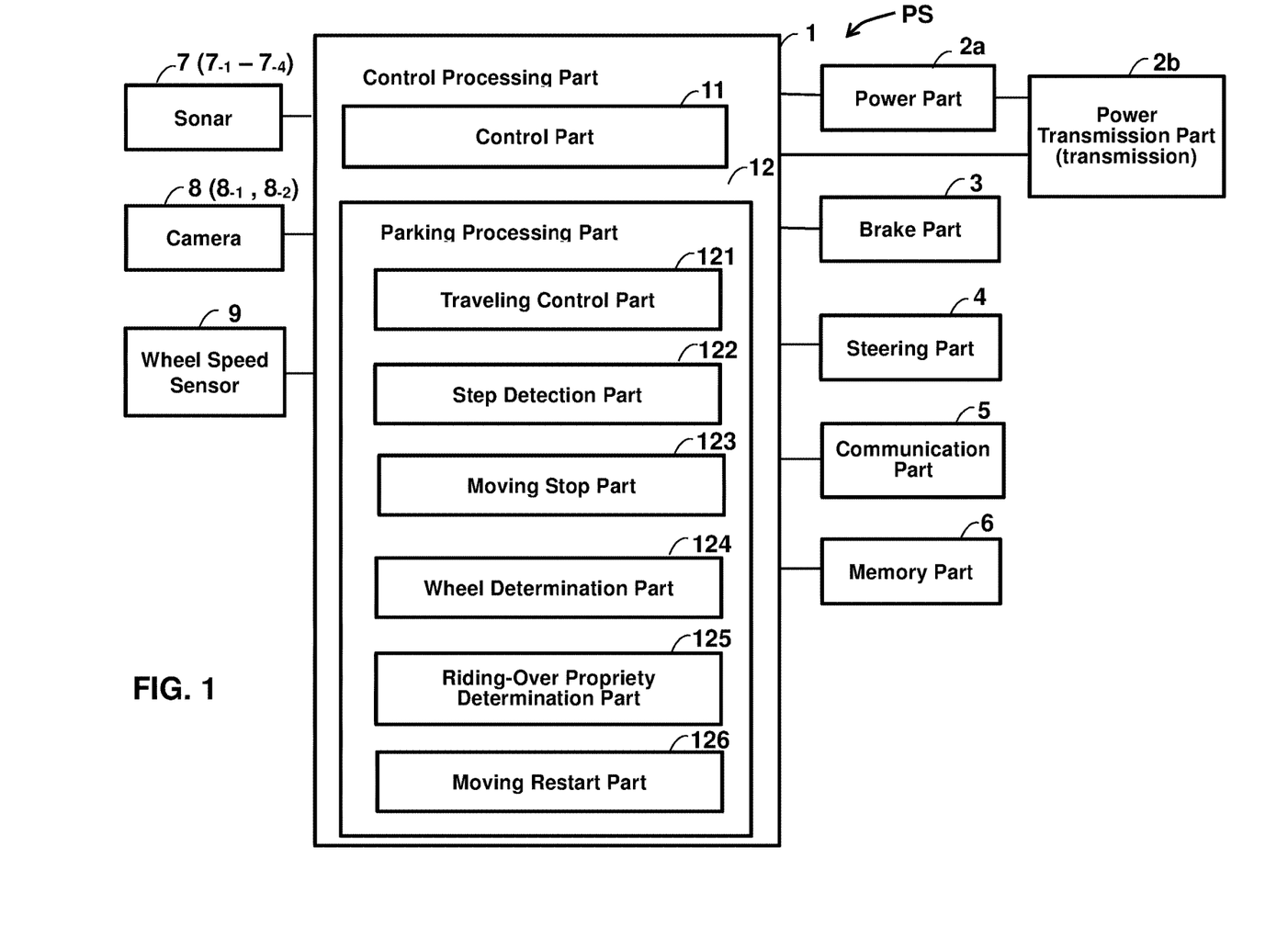
FIG. 1 is a block diagram showing constitution of a parking support device of an embodiment.

FIG. 1 is a block diagram showing constitution of a parking support device PS of the present embodiment. The parking support device PS of the present embodiment comprises, as shown in FIG. 1, a control processing part 1, a communication part 5, and a memory part 6, for example. In the present embodiment, the parking support device PS further comprises a sonar 7 ($7_{-1}$-$7_{-4}$), a camera 8 ($8_{-1}$, $8_{-2}$), and a wheel speed sensor 9, which are respectively provided to recognize a vehicle-surrounding condition and a vehicle state for the control of vehicle parking, and a power part 2a, a power transmission part 2b, a brake part 3, and a steering part 4, which are respectively provided to attain the vehicle parking.

The sonar 7 is a device which is connected to the control processing part 1 and configured to detect presence/absence of an object in a detection range which is a relatively short range around the vehicle (within 1.5-1.0 m, for example) and measure a distance from the vehicle to the detected object according to the control of the control processing part 1. The sonar 7 outputs results (results of detection and measurement) to the control processing part 1. The sonar 7 is an active-supersonic sonar, for example, which comprises first-fourth sonars $7_{-1}$-$7_{-4}$ which are respectively positioned at four corners of the vehicle. The above-described active-supersonic sonar is configured, for example, such that it sends supersonic waves and comprises a piezoelectric element, a signal processor, and others. The piezoelectric element receives reflection waves of the sent supersonic waves. The signal processor is configured such that the presence/absence of the object is detected by determination as to whether the reflected waves are received by the above-described piezoelectric element in the above-described detection range, and in a case where the object is detected, the distance from the vehicle to the object is obtained from a time difference between the sending timing of the supersonic waves and the receiving timing of the reflected waves and a speed of the supersonic waves. A strength of the supersonic waves sent from the sonar is appropriately set according to the above-described detection range.

The camera 8 is a device which is connected to the control processing part 1 and configured to produce images according to the control of the control processing part 1. In the present embodiment which is configured to move the vehicle in the longitudinal direction and stop the vehicle in a specified space, the camera 8 comprises a forward camera $8_{-1}$ and a rearward camera $8_{-2}$ which respectively produce images of a vehicle forward side and a vehicle rearward side, for example. The forward camera $8_{-1}$ and the rearward camera $8_{-2}$ are installed at the vehicle such that they respectively image the vehicle forward side and the vehicle rearward side including a road surface. The forward camera $8_{-1}$ is provided on a ceiling face (roof inside face) near a windshield inside the vehicle such that its imaging direction (a direction of an optical axis) slants downwardly, for example. Thereby, the forward camera $8_{-1}$ produces the images of the vehicle forward side (forward images) and outputs the produced forward images to the control processing part 1. The rearward camera $8_{-2}$ is provided at a rear end portion of the vehicle such that its imaging direction slants downwardly, for example Thereby, the rearward camera $8_{-2}$ produces the images of the vehicle rearward side (rearward images) and outputs the produced rearward images to the control processing part 1. This camera is a digital camera, for example, which comprises an imaging optical system which forms an optical image of a subject on a specified imaging face, an area image sensor which is provided such that its light-receiving surface matches the specified imaging face and transfers the optical image of the subject to an electrical signal, an image processing section which makes image data of the subject by image-processing the output of the area image sensor, and others.

Herein, the sonar 7 and the camera 8 for recognizing the vehicle-surrounding conditions described above are mere examples and not limited to these. For example, either one of these may be used, or any other device, a radar or a distance-image sensor, may be used instead.

The wheel speed sensor 9 is a device which is connected to the control processing part 1 and configured to measure a rotational speed of the wheel (wheel speed) according to the control of the control processing part 1. The wheel speed sensor 9 comprises a rotary encoder and its peripheral circuits, for example, and measures the wheel speed from displacement quantity of a rotation of the wheel (axle) per unit time. The wheel speed sensor 9 outputs the measured wheel speed to the control processing part 1.

The power part 2a is a device which is connected to the control processing part 1 and configured to generate a power for driving (moving) the vehicle according to the control of the control processing part 1. The power part 2a comprises, for example, a motor, such as an engine, an electric motor, or a hybrid device, and its accessory devices. The power transmission part 2b is a mechanism which transmits the power generated by the power part 2a to the drive wheel, and comprises a transmission to switch a moving direction of the vehicle according to the control of the control processing part 1. Thus, the power generated by the power part 2a is transmitted to the drive wheel through the power transmission part 2b, thereby rotating the drive wheel.

The brake part 3 is a device which is connected to the control processing part 1 and configured to decelerate the vehicle by applying a braking force to the vehicle according to the control of the control processing part 1. The brake part 3 can stop the vehicle finally by decelerating the vehicle and also can maintain this stopping by continuing application of the braking force to the stopped vehicle as well. The brake part 3 comprises, for example, a brake device, such as a disk brake or a regenerative brake, and its accessory devices. Herein, the brake part 3 performs a function of a so-called parking brake as well.

The steering part 4 is a device which is connected to the control processing part 1 and configured to steer the vehicle according to the control of the control processing part 1. The steering part 4 comprises a steering device for changing a direction of a steering wheel of the vehicle and its accessory devices.

The acceleration of the vehicle, the wheel speed, and the vehicle speed are adjusted by controlling the power part 2a and the brake part 3, respectively. The moving direction (forward moving, backward moving) of the vehicle is adjusted by controlling the transmission of the power transmission part 2b. The traveling direction of the vehicle is adjusted by controlling the steering part 4.

The communication part 5 is a device which is connected to the control processing part 1 and configured to communicate with a specified communication terminal RT (see FIG. 3A) according to the control of the control processing part 1.

The communication terminal RT is, for example, a key fob RT to lock/unlock a door of the vehicle or the like. In the present embodiment, the key fob RT as the communication terminal RT comprises a lock switch, an unlock switch, a communication antenna, a communication circuit for sending/receiving a specified communication signal, such as a control signal, to or from the communication part 5 through the communication antenna, and its peripheral circuits, and this key fob RT sends a control signal for locking/unlocking the door (locking/unlocking control signal) according to respective input operations of the lock switch and the unlock switch. In the present embodiment, the key fob RT further comprises a parking switch, and the above-described communication circuit is configured to send a control signal (parking start control signal), which commands starting of the vehicle parking such that the vehicle is moved in the longitudinal direction and then stopped in the specified space, to the communication part 5 through the communication antenna according to a first input operation of the parking switch (one push-operation, for example), and also send another control signal (restart control signal), which commands restarting of the moving of the vehicle stopped by detection of the step (which will be specifically described later), to the communication part 5 through the communication antenna according to a second input operation of the parking switch (sequent two push-operation, for example) which is different from the above-described input operation. Herein, while the above-described example is configured such that the parking start control signal and the restart control signal are sent by the first and second input operations for the parking switch, any other type is applicable. For example, the parking start control signal may be sent by a first-time input operation of the parking switch and the restart control signal may be sent by a second-time input operation of the parking switch within a specified period of time from sending of the above-described parking start control signal. Moreover, the first parking switch for the parking start control signal and the second parking switch for the restart control signal are provided at the key fob RT separately.

The memory part 6 is a circuit which is connected to the control processing part 1 and configured to memorize various kinds of program and data according to the control of the control processing part 1. The above-described various kinds of program include, for example, control programs of controlling the respective parts 2a, 2b, and 3-9 of the parking support device PS based on their functions and control processing programs, such as a parking processing program for moving the vehicle in the longitudinal direction and stopping it in the specified space. The parking processing program includes a traveling control program to set (obtain) a vehicle stopping position in the specified space and guide the vehicle to this vehicle stopping position with a predetermined vehicle speed by moving the vehicle in the longitudinal direction, a step detection program to detect the presence/absence of the step in the moving direction of the vehicle (the longitudinal direction, the forward direction or the rearward direction), a moving stop program to stop the moving of the vehicle in a case where the presence of the step is detected by the step detection program, a moving restart program to restart the moving of the vehicle so as to ride over the step in a case where the control signal (the restart control signal in the above-described example) from the communication terminal (the key fob in the above-described example) RT is received after the moving of the vehicle is stopped by the moving stop program, a wheel determination program to determine whether the vehicle wheel contacting the step is the drive wheel, a propriety determination program to determine whether the vehicle wheel is able to ride over the step, and the like. The above-described specified data include various kinds of data necessary for executing the respective programs, such as drive-wheel information on the drive wheel (front-wheel drive, rear-wheel drive, or four-wheel drive, for example) and various kinds of threshold used for the respective detections and determinations. The memory part 6 comprises, for example, ROM (Read Only Memory) as a nonvolatile storage element and EEPROM (Electrically Erasable Programmable Read Only Memory) as a rewritable nonvolatile storage element, and others. The memory part 6 includes RAM (Random Access Memory) as a so-called working memory of the control processing part 1 for memorizing the data and the like which are generated during executions of the above-described programs.

The control processing part 1 is a circuit which is configured to control each function of the respective parts 2a, 2b, 3-9 of the parking support device PS and thereby control the vehicle parking such that the vehicle is moved in the longitudinal direction and then stopped in the specified space in order to support the vehicle user's parking operation. The control processing part 1 comprises CPU (Central Processing Unit) and its peripheral circuits, for example. The control processing part 1 functionally comprises a control part 11 and a parking processing part 12 by execution of the above-described control processing program.

The control part 1 governs a total control of the parking support device PS by controlling each function of the respective parts 2a, 2b, 3-9 of the parking support device PS.

The parking processing part 12 is configured to move the vehicle in the longitudinal direction and stop the vehicle in the specified space. The parking processing part 12 functionally comprises a traveling control part 121, a step detection part 122, a moving stop part 123, a wheel determination part 124, a riding-over propriety determination part 125, and a moving restart part 126.

The traveling control part 121 is configured to set (obtain) the vehicle stopping position in the specified space and guide the vehicle to this vehicle stopping position with the predetermined vehicle speed by moving the vehicle in the longitudinal direction. For example, the traveling control part 121 extracts the above-described space from the images produced by the camera 8 directed to the vehicle moving direction (the rearward camera 8-$_2$ in a case where the vehicle retreats for parking in the space, the forward camera 8-$_1$ in a case where the vehicle advances for parking in the space), extracts a terminal end of the vehicle moving direction in the extracted space, a car stop (wheel stop), or the like which is provided in this space, and then set a position which is away from the above-described extracted terminal end, car stop, or the like by a specified distance which is previously set based on a whole length of the vehicle as the above-described vehicle stopping position. The above-described extraction of the space is executed by extracting a border line to define (partition) the above-described space from the above-described images by means of an image processing, such as edge detection or Hough transformation, for example. The results of the sonar 7 may be used. Then, the traveling control part 121 controls the transmission of the power transmission part 2b so that the vehicle moves toward the above-described moving direction, controls the steering part 4 so that the vehicle's moving direction becomes the longitudinal direction, controls the power part 2a so that the vehicle's moving speed becomes the above-described predetermined specified speed (the brake part 3 is also controlled as required), and controls the brake part 3 and the power part 2a so that the vehicle stops at the above-described stopping position. Herein, the above-described vehicle moving in the longitudinal direction may be attended with a fine adjustment of steering operation.

The moving direction of the vehicle when the vehicle parking is started is determined by referring to a position of a shift lever (a select lever, a selector) operated by the vehicle user, for example. Further, the retreat may be set as the moving direction of the vehicle when the vehicle parking is started with default settings, for example.

The step detection part 122 detects the presence/absence of the step in the above-described moving direction of the vehicle. For example, the step detection part 122 detects the presence/absence of the step based on the wheel speed measured by the wheel speed sensor 9. More specifically, since the wheel speed decreases when the vehicle contacts the step, the step detection part 122 is configured to determine the presence/absence of the step by determining whether the wheel speed measured by the wheel speed sensor 9 becomes lower than a predetermined threshold (a first step-determination threshold). Further, for example, the step detection part 122 detects the presence/absence of the step based on a torque of the wheel. More specifically, since the torque of the wheel increases when the vehicle contacts the step, the parking support device PS is provided with a torque sensor to measure the torque of the wheel (axle), and the step detection part 122 is configured to determine the presence/absence of the step by determining whether the torque of the wheel (axle) becomes more than a specified torque in a case where the vehicle moves with the above-described previously-set vehicle speed and also a predetermined threshold (a second step-determination threshold). The images of the camera 8 and the results of the sonar 7 may be used.

The moving stop part 123 is configured to stop the above-described vehicle moving in the case where the presence of the step is detected by the step detection part 122. More specifically, the moving stop part 123 stops the above-described vehicle moving by controlling the brake part 3 in the case where the presence of the step is detected by the step detection part 122. While the moving stop part 123 may be configured to stop generation of the power by the power part 2a, stop the above-described vehicle moving by the brake part 3, and maintain this stopping, the present embodiment is configured such that the moving stop part 123 stops the vehicle moving by the brake part 3, without stopping the generation of the power conducted by the power part 2a, and maintains this stopping. Further, the moving stop part 123 of the present embodiment is configured to stop the vehicle moving after moving the vehicle by a specified distance in an opposite direction to the above-described moving direction in a case where it is determined by the wheel determination part 124 that the wheel contacting the step is not the drive wheel. More specifically, in the case where the presence of the step is detected by the step detection part 122 is detected, the moving stop part 123 controls the transmission of the power transmission part 2b so that the opposite direction to the vehicle moving direction when the presence of the step is detected becomes a new vehicle moving direction and controls the power part 2a so that the vehicle moves by the specified distance, and then stops this moving by controlling the brake part 3 after the vehicle moves this specified distance. This specified distance is used for a running start of the vehicle which is enough to ride over the step and is distance from a detection position of the step to a position between the start position of the above-described moving of the vehicle and the detection position of the step, which is previously set appropriately. The above-described specified distance may be set at 5 cm, 10 cm, 15 cm, or the like from viewpoints of the running start, for example. The moving distance of the vehicle can be measured from the displacement quantity of the rotation of the wheel (axle) measured by the wheel speed sensor 9, for example.

The wheel determination part 124 is configured to determine whether the wheel of the vehicle which contacts the step is the drive wheel. More specifically, the wheel determination part 124 determines whether the vehicle wheel contacting the step is the drive wheel based on the moving direction of the vehicle and the drive-wheel information on the drive wheel which is memorized at the memory part 6. For example, in a case where the moving direction of the vehicle is the retreat and the drive-wheel information indicates the rear-wheel drive, the wheel determination part 124 determines that the vehicle wheel contacting the step is the drive wheel. Meanwhile, the wheel determination part 124 determines that the vehicle wheel contacting the step is not the drive wheel in a case where the moving direction of the vehicle is the retreat and the drive-wheel information indicates the front-wheel drive.

The riding-over propriety determination part 125 is configured to determine whether the vehicle is able to ride over the step. More concretely, in the present embodiment, since the wheel speed sensor 9 measures the displacement quantity of the rotation of the wheel (axle), the riding-over propriety determination part 125 determines whether the vehicle is able to ride over the step based on this displacement quantity and the wheel speed (or the toque of the wheel). More specifically, the height of the step to be ridden over is previously set appropriately according to the kinds of the vehicle (6 cm, 8 cm, 10 cm, of the like, for example), a threshold (riding-over propriety displacement threshold) is set based on the displacement quantity of the wheel rotation which is necessary to ride over the above-described preciously-set step height. Herein, since the moving distance of the vehicle differs according to a radius of the wheel even if the displacement quantity of the wheel rotation is the same, the wheel radius of the wheel is to be considered in the above-described setting of the riding-over propriety displacement threshold. Then, the riding-over propriety determination part 125 determines whether the displacement quantity of the vehicle rotation measured by the wheel speed sensor 9 becomes the riding-over propriety displacement threshold or greater from the above-described restart of the vehicle moving by the moving restart part 126. In the case where the displacement quantity of the vehicle rotation becomes the riding-over propriety displacement threshold or greater, the riding-over propriety determination part 125 determines whether the vehicle is able to ride over the step by determining whether the wheel speed measured by the wheel speed sensor 9 is the above-described first step-determination threshold or lower (or by determining whether the torque of the wheel is the above-described second step-determination threshold or greater). When the displacement quantity of the vehicle rotation becomes the riding-over propriety displacement threshold or greater, the riding-over propriety determination part 125 determines that the vehicle is unable to ride over the step in the case where the wheel speed measured by the wheel speed sensor 9 is the above-described first step-determination threshold or lower (or in the case where the torque of the wheel is the above-described second step-determination threshold or greater). Meanwhile, when the displacement quantity of the vehicle rotation becomes the riding-over propriety displacement threshold or greater, the riding-over propriety determination part 125 determines that the vehicle is able to ride over the step in the case where the wheel speed measured by the wheel speed sensor 9 is higher than the above-described first step-determination threshold (or in the case where the torque of the wheel is smaller than the above-described second step-determination threshold).

The moving restart part 126 is configured to restart the above-described vehicle moving so as to ride over the step in a case where the control signal from the communication terminal (the key fob in the above-described example) RT after the above-described vehicle moving is stopped by the moving stop part 123. In the present embodiment, the moving restart part 126 stops the above-described moving again in a case where it is determined by the riding-over propriety determination part 125 that the riding over of the step is unable after restarting the moving of the vehicle so as to ride over the step.

Figure 2:
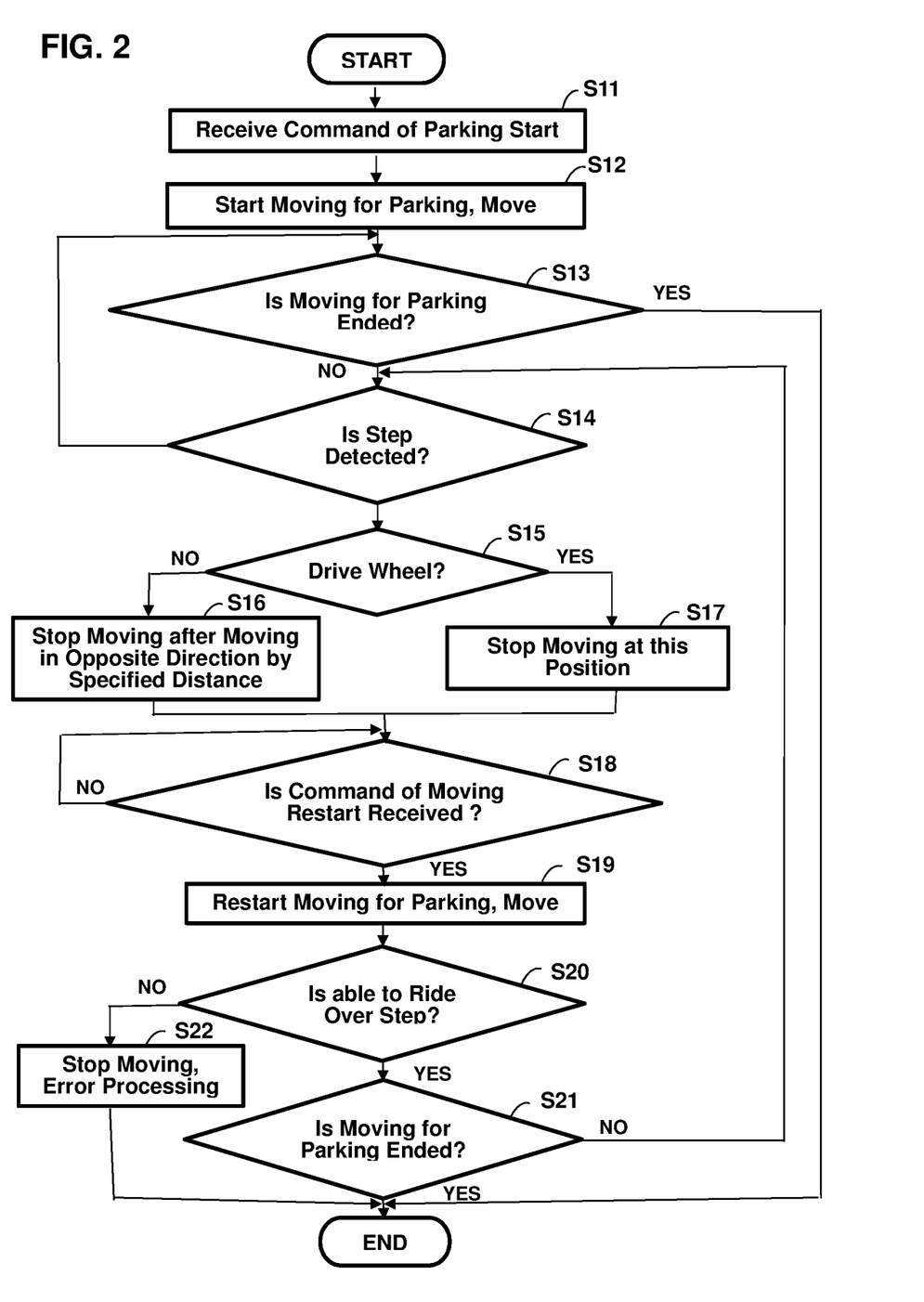
FIG. 2 is a flowchart showing operational steps of the parking support device.
Figure 3A:
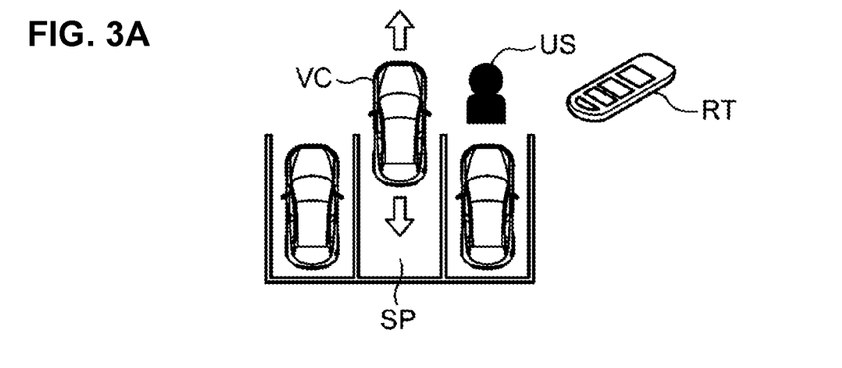
FIGS. 3A-3D are diagrams showing states in vehicle parking from the parking-start timing to the step-detection timing.
Figure 3B:
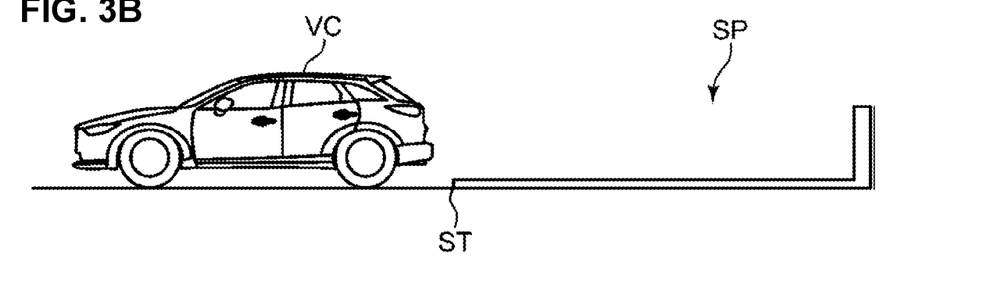
Figure 3C:
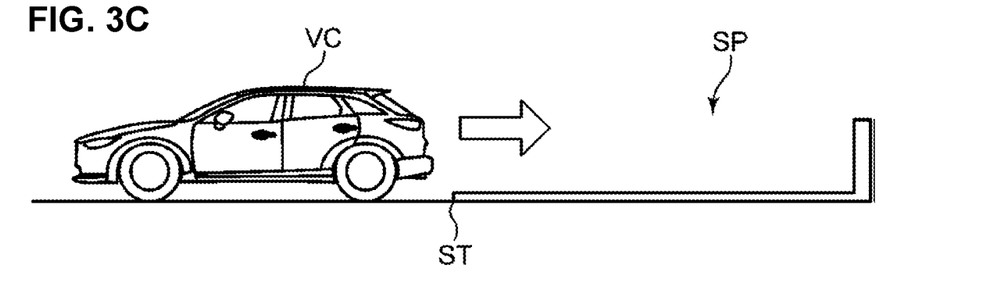
Figure 3D:
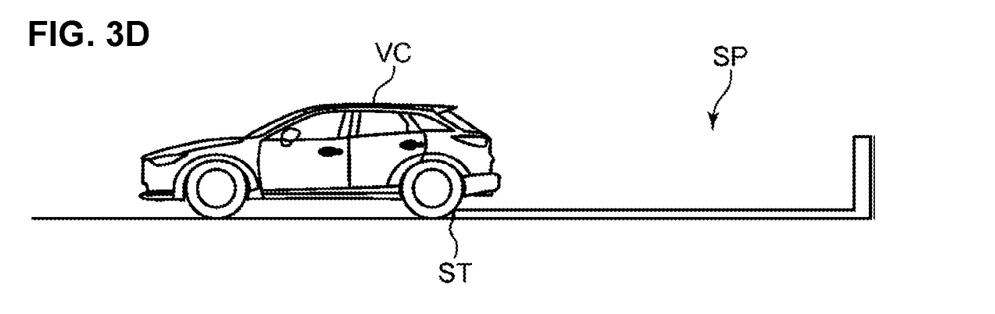
Figure 4A:
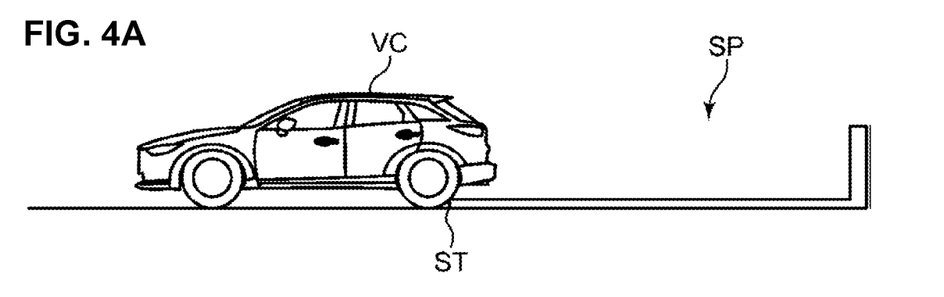
FIGS. 4A, 4B are diagrams showing states in the vehicle parking from the step-detection timing when a drive wheel contacts a step to the timing when the drive wheel rides over the step.
Figure 4B:
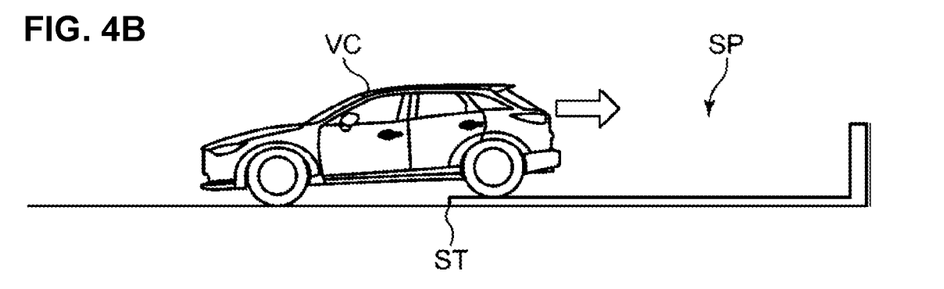
Figure 4C:
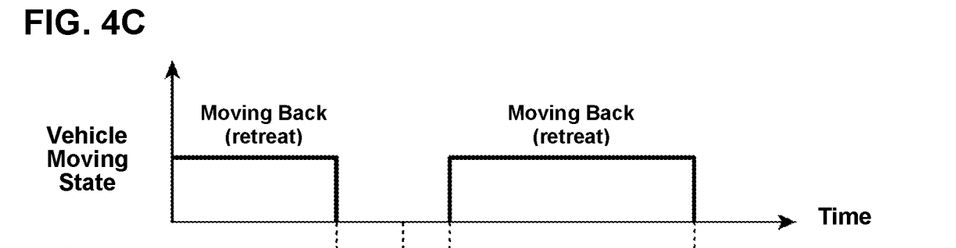
FIGS. 4C, 4D are time charts showing a moving state of the vehicle and an operational state of a brake part
Figure 4D:
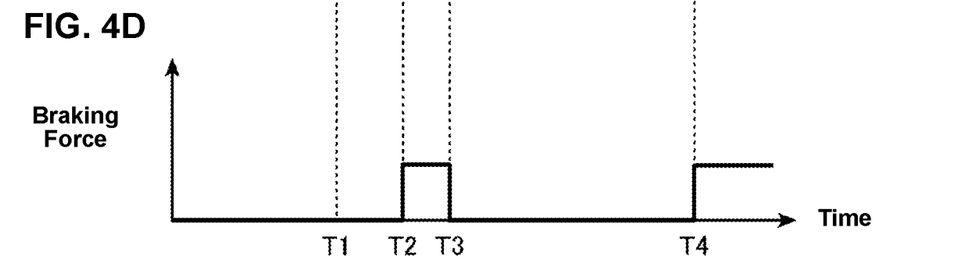
Figure 5A:
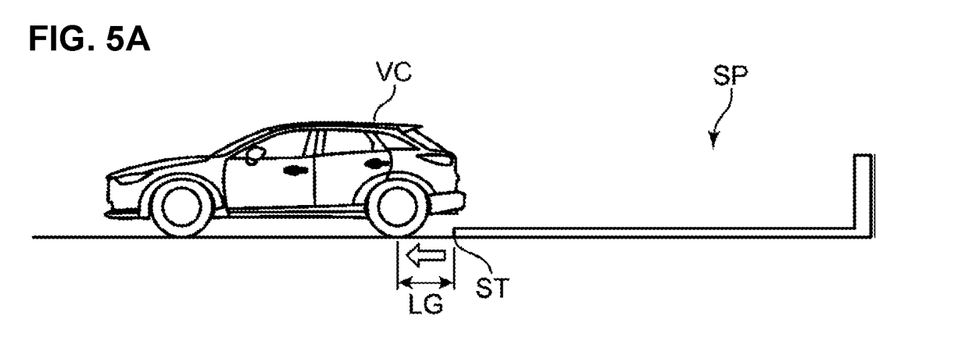
FIGS. 5A, 5B are diagrams showing states in the vehicle parking from the step-detection timing when a non-drive wheel contacts a step to the timing when the non-drive wheel rides over the step.
Figure 5B:
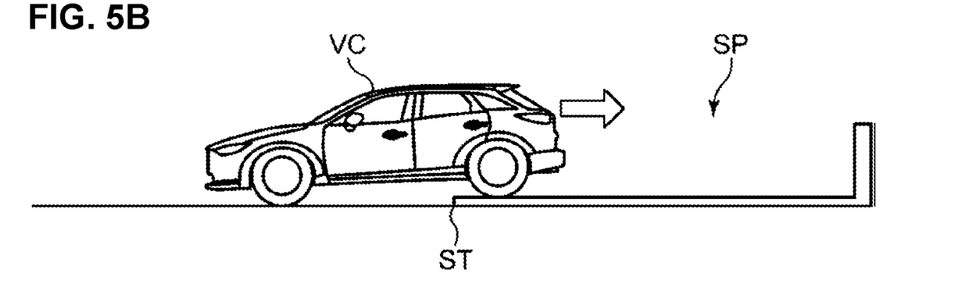
Figure 5C:
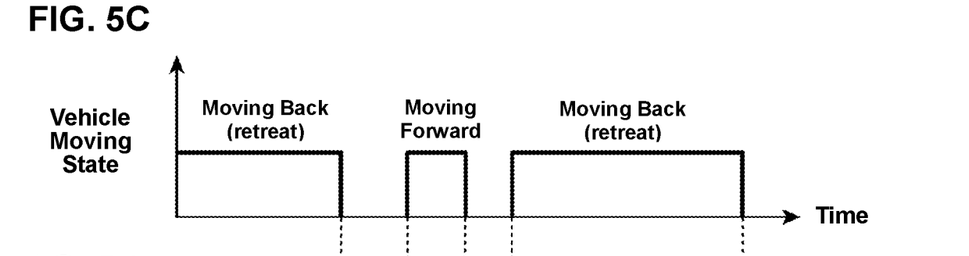
FIGS. 5C, 5D are time charts showing a moving state of the vehicle and an operational state of the brake part.
Figure 5D:
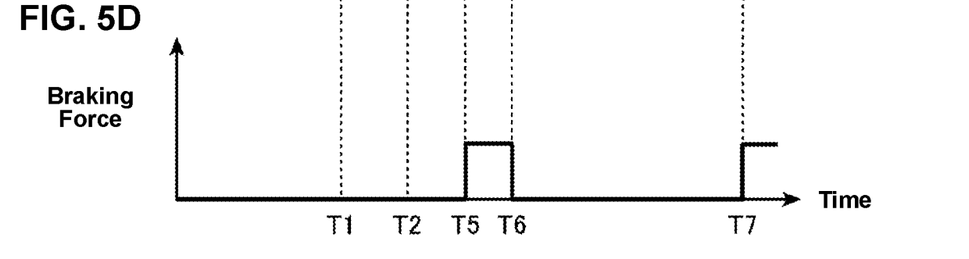

Next, the operations of the present embodiment will be described. FIG. 2 is a flowchart showing operational steps of the above-described parking support device. FIGS. 3A-3D are diagrams showing states in above-described vehicle parking from the parking-start timing to the step-detection timing. FIGS. 3A and 3B show respective states of a vehicle VC at starting of the vehicle parking, FIG. 3C shows the state of the vehicle VC moving in the rearward moving direction after the starting of the vehicle parking, and FIG. 3D shows the state of the vehicle VC contacting a step ST in the rearward moving direction. FIG. 3A is a plan view, and FIGS. 3B-3D are side views. FIGS. 4A, 4B are diagrams showing states in the vehicle parking from the step-detection timing when the drive wheel contacts the step to the timing when the drive wheel rides over the step, and FIGS. 4C, 4D are time charts showing the moving state of the vehicle and an operational state of the brake part. FIG. 4A shows the state of the vehicle VC at the detection timing of the step ST, FIG. 4B shows the state of the vehicle VC at the riding-over timing of the step ST, FIG. 4C is the time chart showing the moving state of the vehicle VC in the vehicle parking, and FIG. 4D is the time chart showing the operational state of the brake part 3 in the vehicle parking. FIGS. 5A, 5B are diagrams showing the states in the vehicle parking from the step-detection timing when a non-drive wheel contacts the step to the timing when the non-drive wheel rides over the step, and FIGS. 5C, 5D are time charts showing the moving state of the vehicle and the operational state of the brake part. FIG. 5A is the diagram showing the state of the vehicle VC which moves in the forward direction by a specified distance for the running start for after contacting the step ST, FIG. 5B is the diagram showing the state of the vehicle VC which rides over the step ST, FIG. 5C is the time chart showing the moving state of the vehicle VC in the vehicle parking, and FIG. 5D is the time chart showing the operational state of the brake part 3 in the vehicle parking. FIGS. 4A, 4B, 5A and 5B are side views. Each horizontal axis of FIGS. 4A, 4B, 5A and 5B shows the time (elapsed time), and each vertical axis of FIGS. 4D and 4D shows the braking force.

As the vehicle VC is activated, the above-described parking support device PS executes initialization of its respective parts and starts its operations. According to execution of its control processing programs, the control part 11 and the parking pressing part 12 are functionally constituted at the control processing part 1, and the traveling control part 121, the step detection part 122, the moving stop part 123, the wheel determination part 124, the riding-over propriety determination part 125, and the moving restart part 126 are functionally constituted at the parking processing part 12.

First, as shown in FIGS. 3A and 3B, a vehicle user US looks for the available (vacant) space SP, moves the vehicle, and stops the vehicle VC in front of an entrance of the space SP so that the vehicle VC will be able to be parked at the space SP. Then, the user US sets the shift lever at a reverse position (back, B) and then gets off the vehicle VC. Thus, since the user US gets off the vehicle VC before the vehicle VC is parked in the space SP, even in a case where another vehicle is stopped beside the space SP, the user US can get off the vehicle VC without paying any particular attention to this other vehicle. Especially, in a case where a fellow passenger is a child, this child can be preferably made to get off the vehicle safely. Further, in a case where baggage is unloaded, this baggage can be preferably made to be unloaded easily. The user US operates the communication terminal RT in order to command the parking support device PS for staring the vehicle parking so that the vehicle VC can be moved in the longitudinal direction and then parked in the space SP. In the above-described example, the user US conducts the first input operation for one-time pushing the parking switch of the key fob RT. Hereafter, the operations will be described by using the "key fob RT" instead of the "communication terminal RT." The key fob RT is configured to send the above-described parking start control signal (command) when receiving the above-described first input operation from the parking switch.

In FIG. 2, when receiving the command of the parking start through reception of the parking start control signal from the key fob RT via the communication part 5 (S11), the vehicle VC starts its moving for parking and moves as shown in FIG. 3C, for example (S12). More concretely, the control processing part 1 sets the stopping position in the space SP as described above and guides the vehicle to this stopping position with the specified vehicle speed by moving the vehicle in the longitudinal direction, in the backward direction according to the example shown in FIGS. 3A-3D, by means of the traveling control part 121 of the parking processing part 12.

Next, the control processing part 1 determines whether the vehicle moving for parking is ended by arrival of the vehicle VC at the above-described stopping position by means of the traveling control part 121 of the parking processing part 12 (S13). For example, the traveling control part 121 determines whether the vehicle moving for parking is ended by determining whether the vehicle VC moves (travels) by a distance (moving distance necessary for parking) from the starting position to the stopping position of the vehicle moving for parking based on the displacement quantity of the wheel rotation measured by the wheel speed sensor 9. Alternatively, for example, it is determined whether the vehicle moving for parking is ended by determining whether the vehicle VC arrives at the above-described stopping position from the images produced by the camera 8 (the rearward camera 8-2 in this example). In a case where it is determined that the vehicle VC arrives at the stopping position (YES), the traveling control part 121 ends the vehicle moving for parking and controls the brake part 3 so as to apply the braking force, thereby ending the parking operation. That is, if the step ST does not exist in the space SP, the parking operation is ended. Meanwhile, it is determined that the vehicle VC does not arrive at the stopping position (NO), the control processing part 1 executes processing S14 by means of the step detection part 122 of the traveling control part 121.

In this processing S14, the step detection part 122 determines the presence/absence of the step in the moving direction of the vehicle for parking, in the rearward moving direction in this example. More specifically, the present embodiment is configured such that the step detection part 122 determines whether the wheel speed measured by the wheel speed sensor 9 becomes the above-described first step-determination threshold or lower. In a case where it is determined that the wheel speed measured by the wheel speed sensor 9 becomes the first step-determination threshold or lower, it is determined that there exists the step (YES), and then the control part 1 executes processing S15 by means of the wheel determination part 124 of the parking processing part 12 accordingly. Meanwhile, in a case where it is determined that the wheel speed does not become the first step-determination threshold or lower, it is determined that there exists no step (NO), and the control processing part 1 returns its processing to the processing S13.

Accordingly, once the vehicle moving for parking is started, the processing S13 and the processing S14 are repeatedly executed until the vehicle moving for parking is ended or the step is detected. If the vehicle moving for parking is ended, the parking operation is ended, whereas processing S15 is executed if the step is detected. In the example shown in FIG. 3, since the step ST exists in the space SP, the vehicle VC contacts the step ST during the vehicle moving for parking as shown in FIG. 3D, and the processing 15 is executed after the processing S14.

In this processing S15, the wheel determination part 124 determines whether the vehicle wheel contacting the step is the drive wheel based on the vehicle moving and the drive-wheel information memorized at the memory part 6. In a case where it is determined that the vehicle wheel contacting the step is the drive wheel (YES), the control processing part 1 stops the vehicle moving by controlling the brake part 3 by means of the moving stop part 123 of the parking processing part 12 (S16), and then executes processing S18 by means of the moving restart part 126 of the parking processing part 12. Accordingly, in this case, the vehicle VC shown in FIG. 3D is stopped at a position where it is determined that the step exists as shown in FIG. 4A. Meanwhile, in a case where it is determined that the vehicle wheel contacting the step is not the drive wheel (NO), the control processing part 1 stops the vehicle moving after moving the vehicle VC in the opposite direction to the moving direction by the specified distance by means of the moving stop part 123 of the parking processing part 12 (S17), and subsequently executes the processing S18 by means of the moving restart part 126 of the parking processing part 12. Accordingly, in this case, the vehicle VC shown in FIG. 3D is, as shown in FIG. 5A, stopped at a position which is advanced forwardly by a specified distance LG from the position where it is determined that the step exists during the vehicle's retreat.

Herein, in the above-described stopping of the vehicle moving for parking, the moving stop part 123 stops the vehicle moving by means of the brake part 3, without stopping generation of the power by means of the power part 2a, and maintains this stopping of the vehicle moving as described above.

In this processing S18, the moving restart part 126 determines whether the command of restarting the vehicle moving is received by determining whether the restart control signal is received from the key fob RT via the communication part 5. In a case where it is determined that the command of restarting the vehicle moving is received by reception of the restart control signal (YES), the moving restart part 126 executes processing S19, whereas in a case where it is determined that the command of restarting the vehicle moving is not received by non-reception of the restart control signal (NO), the moving restart part 126 returns its processing to the processing S18. Accordingly, the processing S18 is repeatedly executed by means of the moving restart part 126 until the command of restarting the vehicle moving is received.

The vehicle user US operates the key fob RT for restarting the vehicle moving for parking when recognizing the stopping of the vehicle moving during the vehicle moving for parking. In the above-described example, the vehicle user US conducts the second input operation by continuously pushing the parking switch of the key fob RT. The key fob RT sends the restart control signal when receiving the second input operation from the parking switch.

When the command of restarting the vehicle moving is received through the reception of the restart control signal from the key fob RT via the communication part 5, the processing S19 is executed after the processing S18 as described above. In this processing S19, the moving restart part 126 restarts the vehicle moving for parking and moves the vehicle.

After the processing S19, the control processing part 1 determines whether the vehicle is able to ride over the step by means of the riding-over propriety determination part 125 of the parking processing part 12 (S20). In a case where it is determined that the vehicle is able to ride over the step (YES), the control processing part 1 executes processing S21 by means of the traveling control part 121. Meanwhile, in a case where it is determined that the vehicle is unable to ride over the step (NO), the control part 1 executes processing S22 by means of the moving restart part 126.

In the processing S21, similarly to the above-described processing S13, the traveling control part 121 determines whether the vehicle moving for parking is ended by the arrival of the vehicle VC at the above-described stopping position. In a case where it is determined that the vehicle VC arrives at the stopping position (YES), the traveling control part 121 ends the vehicle moving for parking and controls the brake part 3 so that the parking brake is applied, thereby ending the parking operation. Meanwhile, in a case where it is determined that the vehicle VC does not arrive at the stopping position (NO), the control processing part 1 executes processing S14 by means of the step detection part 122 of the parking processing part 12. Accordingly, the same processing as the above-described ones are executed if it is determined that there exists another step after restarting the vehicle moving.

In the processing S22, the moving restart part 126 stops the vehicle moving again, executes specified error processing, and ends the parking operation. The above-described error processing includes, for example, a processing of warning the vehicle user US that the vehicle is unable to ride over the step by using a warning sound, announce, or the like.

In a case where the vehicle is able to ride over the step ST, as shown in FIG. 4B, the vehicle VC shown in FIG. 4A is parked in the space SP after riding over the step, and as shown in FIG. 5B, the vehicle VC shown in FIG. 5A is parked in the space SP after riding over the step, having the running start.

According to the parking operation having the above-described processing, in the case where the drive wheel of the vehicle VC contacts the step ST, the command of the parking start from the key fob RT is received. When the vehicle moving for parking is started, the vehicle VC retreats (moves back) as shown in FIGS. 3C and 4C. Then, the drive wheel contacts the step ST at an elapsed time T1 as shown in FIG. 3D, and the retreat of the vehicle is blocked by the step ST and thereby the presence of the step is determined by the step detection part 122 at an elapsed time T2 as shown in FIG. 4C. The braking force is applied by the brake part 3 and thereby the vehicle moving for parking is stopped as shown in FIGS. 4A and 4D. Then, the above-described applying of the braking force by the brake part 3 is released at an elapsed time T3 when the command of the moving restart from the key fob RT is received as shown in FIG. 4D. The retreat moving of the vehicle VC is restarted as shown in FIG. 4C, and the vehicle VC is moves back further after riding over the step ST as shown in FIG. 4B. When the vehicle VC arrives at the above-described stopping position, the braking force by the brake part 3 is applied and thereby the retreat moving is stopped at an elapsed time T4, and the parking brake is applied by the brake part 3 as shown in FIGS. 4C and 4D. In this case, while the moving restart part 126 may restart the above-described vehicle moving with the same magnitude of power as the power generated by the power part 2a before the stop of the above-described vehicle moving so that the vehicle can ride over the step ST, the above-described restart by the moving restart part 126 may be conducted with the power which is greater than the power generated by the power part 2a before the stop of the above-described vehicle moving so that the vehicle can ride over the step ST properly easily.

Meanwhile, in the case where the vehicle wheel contacting the step ST is not the drive wheel, the command of the parking start from the key fob RT is received. When the vehicle moving for parking is started, the vehicle VC retreats (moves back) as shown in FIGS. 3C and 5C. Then, this wheel contacts the step ST at the elapsed time T1 as shown in FIG. 3D, and the retreat of the vehicle is blocked by the step ST and thereby the presence of the step is determined by the step detection part 122 at the elapsed time T2 as shown in FIG. 5C. The braking force is applied by the brake part 3 at an elapsed time T5 after the vehicle VC is moved forwardly in an opposite direction to the retreat (backward) direction by the specified distance LG and thereby the vehicle moving for parking is stopped as shown in FIGS. 5A, 5C and 5D. Then, the above-described applying of the braking force by the brake part 3 is released at an elapsed time T6 when the command of the moving restart from the key fob RT is received as shown in FIG. 5D. The retreat moving of the vehicle VC is restarted as shown in FIG. 5C, and the vehicle VC is moves back further after riding over the step ST as shown in FIG. 5B. When the vehicle VC arrives at the above-described stopping position, the braking force by the brake part 3 is applied and thereby the retreat moving is stopped at an elapsed time T7, and the parking brake is applied by the brake part 3 as shown in FIGS. 5C and 5D. In this case as well, while the moving restart part 126 may restart the above-described vehicle moving with the same magnitude of power as the power generated by the power part 2a before the stop of the above-described vehicle moving so that the vehicle can ride over the step ST, the above-described restart by the moving restart part 126 may be conducted with the power which is greater than the power generated by the power part 2a before the stop of the above-described vehicle moving so that the vehicle can ride over the step ST properly easily.

As described above, according to the parking support device PS of the present embodiment and the parking support method executed by the present parking support device, when the presence of the step is detected while the vehicle is moving to the specified space, the vehicle moving is stopped, and the vehicle moving is restarted when the control signal from the communication terminal RT (the key fob RT in the present example) is received. Accordingly, since the vehicle user can recognize the presence of the step, the vehicle user can operate the communication terminal RT, mentally preparing for that, so that the present parking support device PS and the present parking support method can reduce the concern of the vehicle user properly.

In the case where the vehicle wheel contacting the step is the drive wheel, the vehicle VC rides over the step with the drive wheel itself, so that it is likely that the power to be transmitted to the drive wheel is utilized for this step riding-over. Consequently, the vehicle VC rides over the step easily compared to a case where the vehicle wheel contacting the step is not the drive wheel. Meanwhile, if the vehicle wheel contacting the step is not the drive wheel, the above-described situation does not happen, so that there may occur a state where the vehicle does not ride over the step ST easily. According to the present parking support device PS and the present parking support method, however, in the case where it is determined by the wheel determination part 124 that the vehicle wheel contacting the step is not the drive wheel, the above-described vehicle moving is stopped after moving the vehicle VC by the specified distance in the opposite direction to the moving direction. Thereby, the vehicle VC can have the running start for the above-described restarting because the vehicle VC further moves by the specified distance before contacting the step, so that the vehicle can ride over the step properly easily.

Further, according to the present parking support device PS and the present parking support method, since the vehicle moving is stopped through braking conducted by the brake part 3, without stopping the generation of the power conducted by the power part 2*a*, and this stopping is maintained, it is only necessary to control the brake part 3 but controlling of the power part 2*a* is unnecessary during the stop of the vehicle VC. Thereby, the control processing of the parking support can be facilitated.

Moreover, according to the present parking support device PS and the present parking support method, since the vehicle moving is stopped again in the case where it is determined that the vehicle wheel is unable to ride over the step after the above-described restarting of the vehicle moving, any improper thing which may happen in a case the vehicle is forced to repeatedly ride over the step, such as any damage caused to the vehicle VC, can be avoided.

The present invention should not be limited to the above-described embodiment(s) and any other modifications or improvements may be applied within the scope of a spirit of the present invention.

What is claimed is:

1. A parking support device which is configured to move a vehicle in a longitudinal direction and stop the vehicle in a specified space by using a communication terminal to send a control signal to the vehicle, the parking support device comprising:
   a step detection part configured to detect presence/absence of a step in a moving direction of the vehicle;
   a moving stop part configured to stop moving of the vehicle in a case where presence of the step is detected by said step detection part;
   a moving restart part configured to restart the moving of the vehicle so as to ride over the step in a case where the control signal from the communication terminal is received after the moving of the vehicle is stopped by said moving stop part; and
   a wheel determination part configured to determine whether a vehicle wheel which contacts the step for riding over is a drive wheel, wherein said moving stop part is configured to stop the moving of the vehicle after moving the vehicle by a specified distance in an opposite direction to said moving direction in a case where it is determined by said wheel determination part that the vehicle wheel contacting the step is not the drive wheel.

2. The parking support device of claim 1, further comprising a power part configured to generate a power for moving the vehicle and a brake part configured to brake the vehicle, wherein said moving stop part is configured to stop the moving of the vehicle through braking conducted by said brake part, without stopping generation of the power conducted by said power part, and maintain stopping of the moving of the vehicle.

3. The parking support device of claim 2, further comprising a riding-over propriety determination part configured to determine whether the vehicle wheel is able to ride over the step, wherein said moving restart part is configured to stop the moving of the vehicle again in a case where it is determined by said riding-over propriety determination part that the vehicle wheel is unable to ride over the step after said restarting of the moving of the vehicle based on reception of the control signal from the communication terminal.

4. The parking support device of claim 1, further comprising a riding-over propriety determination part configured to determine whether the vehicle wheel is able to ride over the step, wherein said moving restart part is configured to stop the moving of the vehicle again in a case where it is determined by said riding-over propriety determination part that the vehicle wheel is unable to ride over the step after said restarting of the moving of the vehicle based on reception of the control signal from the communication terminal.

5. The parking support device of claim 1, wherein the vehicle is parked in the specified space by riding over the step in a case where it is determined by said wheel determination part that the vehicle wheel contacting the step is not the drive wheel.

6. The parking support device of claim 1, further comprising a control processing part, wherein
   in a case where it is determined that the vehicle wheel contacting the step is the drive wheel, the control processing part is configured to stop the vehicle moving by controlling a brake part by means of the moving stop part, and then execute processing to move the moving restart part, wherein the vehicle is stopped at a position where it is determined that the step exists, and
   in a case where it is determined that the vehicle wheel contacting the step is not the drive wheel, the control processing part is configured to stop the vehicle moving after moving the vehicle in the opposite direction to the moving direction by the specified distance by means of the moving stop part, and subsequently execute the processing to move the moving restart part, wherein the vehicle is stopped at a position which is advanced forwardly by a specified distance from the position where it is determined that the step exists during the vehicle's movement in the opposite direction to the moving direction.

7. A parking support method which is configured to move a vehicle in a longitudinal direction and stop the vehicle in a specified space by using a communication terminal to send a control signal to the vehicle, the parking support method comprising steps of:
   detecting presence/absence of a step in a moving direction of the vehicle;
   stopping moving of the vehicle in a case where presence of the step is detected by said step of detecting the presence/absence of the step;
   restarting the moving of the vehicle so as to ride over the step in a case where the control signal from the communication terminal is received after the moving of the vehicle is stopped by said step of stopping the moving of the vehicle;
   determining whether a vehicle wheel which contacts said step for riding over is a drive wheel; and
   stopping the moving of the vehicle after moving the vehicle by a specified distance in an opposite direction to said moving direction in a case where it is determined that the vehicle wheel contacting the step is not the drive wheel.

8. The parking support method of claim 7, wherein the vehicle is parked in the specified space by riding over the step in a case where it is determined by said wheel determination part that the vehicle wheel contacting the step is not the drive wheel.

9. The parking support method of claim 7, further comprising:
   in a case where it is determined that the vehicle wheel contacting the step is the drive wheel, stopping the vehicle moving by controlling a brake part by means of the moving stop part, and then executing processing to restart the moving of the vehicle, wherein the vehicle is stopped at a position where it is determined that the step exists, and
   in a case where it is determined that the vehicle wheel contacting the step is not the drive wheel, stopping the vehicle moving after moving the vehicle in the opposite direction to the moving direction by the specified distance, and subsequently executing the processing to restart the moving of the vehicle, wherein the vehicle is stopped at a position which is advanced forwardly by a specified distance from the position where it is determined that the step exists during the vehicle's movement in the opposite direction to the moving direction.

* * * * *